United States Patent [19]

Vaahs et al.

[11] Patent Number: 5,138,079

[45] Date of Patent: Aug. 11, 1992

[54] α,ω-CHLOROSILAZANES, AND A PROCESS FOR THEIR PREPARATION

[75] Inventors: Tilo Vaahs, Kelkheim/Taunus; Hans-Jerg Kleiner, Kronberg, both of Fed. Rep. of Germany

[73] Assignee: Hoechst Aktiengesellschaft, Frankfurt am Main, Fed. Rep. of Germany

[21] Appl. No.: 645,460

[22] Filed: Jan. 24, 1991

[30] Foreign Application Priority Data

Jan. 27, 1990 [DE] Fed. Rep. of Germany ....... 4002384

[51] Int. Cl.⁵ .................................. C07F 7/10
[52] U.S. Cl. .................................. 556/412
[58] Field of Search ........................ 556/412

[56] References Cited

U.S. PATENT DOCUMENTS

| | | | |
|---|---|---|---|
| 3,393,218 | 7/1968 | Van Wager et al. | 556/412 |
| 3,755,397 | 8/1973 | Roth et al. | 556/412 X |
| 3,927,057 | 12/1975 | Takamizawa et al. | 556/412 X |
| 4,397,828 | 8/1983 | Seyferth et al. | 423/344 |
| 4,482,669 | 11/1984 | Seyferth et al. | 524/442 |
| 4,540,803 | 9/1985 | Cannady | 556/412 |
| 4,543,344 | 9/1985 | Cannady | 501/92 |
| 4,595,775 | 6/1986 | Arkles | 556/409 |
| 4,720,532 | 1/1988 | Seyferth et al. | 528/28 |
| 4,882,448 | 11/1989 | Vaahs | 556/412 |
| 5,008,423 | 4/1991 | Gerdau et al. | 556/412 |

FOREIGN PATENT DOCUMENTS 88-01260 2/1988 PCT Int'l Appl.

OTHER PUBLICATIONS

Wills, R. R. et al., *Ceramic Bulletin* 62:904-915, No. 8 (1983).

*Primary Examiner*—Paul F. Shaver

[57] ABSTRACT

The invention 1204 to a process for the preparation of α,ω-chlorosilazanes which comprises reacting an oligohydridoorganylsilazane of the formula [—R-SiH—NH—]$_n$ in which n is from about 3 to about 12 with at least one of the chlorosilanes $R^1HSiCl_2$, $R^2R^3SiCl_2$, $R^4SiCl_3$, $Cl_2R^5SiCl_2CH_2$ $SiR^5Cl_2$ and $Cl_3SiCH_2CH_2SiR^6Cl_2$ where R is $C_1$-$C_6$-alkyl or $C_2$-$C_6$-alkenyl and, independently of one another, $R^1$-$R^6$ are H, $C_1$-$C_6$alkyl, or $C_2$-$C_6$-alkenyl, at from $-20°$ C. to $+50°$ C. In addition, the invention relates to the novel α,ω-chlorosilazanes obtainable by this process.

7 Claims, No Drawings

α, ω-CHLOROSILAZANES, AND A PROCESS FOR THEIR PREPARATION

DESCRIPTION

The invention relates to novel chlorine-containing silazanes and to a process for their preparation. The chlorine-containing silazanes according to the invention, also abbreviated to α,ω-chlorosilazanes below, can be converted into polymeric chlorosilazanes by heating. The latter can themselves be converted first into chlorine-free polysilazanes and then into silicon nitride-containing ceramic materials.

The preparation of polysilazanes from other silazanes has already been described (U.S. Pat. No. 4,482,669, U.S. Pat. No. 4,720,532 and PCT-WO 88/01260), as has the pyrolysis of polysilazanes to give silicon nitride-containing ceramic materials (R. R. Wills et al., Ceramic Bulletin, Vol. 62 (1983) 904-915).

To prepare oligomeric or low-molecular-weight silazanes as intermediates for polysilazanes, chlorosilanes have generally been employed hitherto as starting materials and have been reacted with ammonia, or primary or secondary amines (U.S. Pat. No. 4,540,803, U.S. Pat. No. 4,543,344, U.S. Pat. No. 4,595,775 and U.S. Pat. No. 4,397,828).

The present invention now provides novel starting materials for polysilazanes, namely α,ω-chlorosilazanes.

The present invention relates to a process for the preparation of α,ω-chlorosilazanes, which comprises reacting an oligohydridoorganylsilazane of the formula [—RSiH—NH—]$_n$ in which n is from about 3 to about 12, with at least one of the chlorosilanes R$^1$HSiCl$_2$, R$^2$R$^3$SiCl$_2$, R$^4$SiCl$_3$, Cl$_2$R$^5$SiCH$_2$CH$_2$SiR$^5$Cl$_2$ and Cl$_3$SiCH$_2$CH$_2$SiR$^6$Cl$_2$ where R is C$_1$-C$_6$-alkyl or C$_2$-C$_6$-alkenyl and, independently of one another, R$^1$-R$^6$ are H, C$_1$-C$_6$-alkyl or C$_2$-C$_6$-alkenyl, at from −20° C. to +50° C.

R is preferably CH$_3$ and, independently of one another, R$^1$-R$^6$ are preferably H, C$_1$-C$_3$-alkyl or C$_2$-C$_3$-alkenyl. R is particularly preferably CH$_3$ and, independently of one another, R$^1$-R$^6$ are particularly preferably H, CH$_3$ or vinyl.

The chlorosilanes R$^1$HSiCl$_2$, R$^2$R$^3$SiCl$_2$ and R$^4$SiCl$_3$ employed as starting materials are commercially available, and the ethylene-bridged chlorosilanes Cl$_2$R$^5$SiCH$_2$CH$_2$SiR$^5$Cl$_2$ and Cl$_3$SiCH$_2$CH$_2$SiR$^6$Cl$_2$ are accessible by hydrosilylation of R$^1$HSiCl$_2$ and ethyne or by hydrosilylation of vinyl trichlorosilane and R$^1$HSiCl$_2$. The oligohydridoorganylsilazanes also used as starting material are prepared by reacting dichlorohydridoorganylsilane RSiHCl$_2$ where R is as defined above with NH$_3$ in a solvent, as described in U.S. Pat. No. 4,482,669 (see, in particular, columns 4, 5, 7 and 8 therein). This generally gives a mixture of linear and cyclic oligohydridoorganylsilazanes [—RSiH—NH—]$_n$ where n is from about 3 to about 12. For reaction with said chlorosilanes, the oligohydridoorganylsilazanes [—RSiH—NH—]$_n$ are preferably treated carefully, without solvents, with the chlorosilanes. The reaction temperature is from −20° C. to +50° C., preferably −10° C. to 0° C. It is also possible to carry out the reaction in a solvent which does not react with the reactants. Thus, the chlorosilane can be added in pure form as a solution to the oligosilazane in a solvent or as the pure substance. Examples of solvents which are suitable for the reaction are saturated aliphatic or aromatic hydrocarbons, such as n-pentane, cyclohexane or toluene, or chlorinated hydrocarbons, such as chloroform or chlorobenzene, or ethers, such as diethyl ether or THF.

The process may also, if desired, be carried out under reduced pressure. The process may also be carried out continuously. The novel α,ω-chlorosilazanes prepared have a linear molecular structure which may be reproduced by the formula (I)

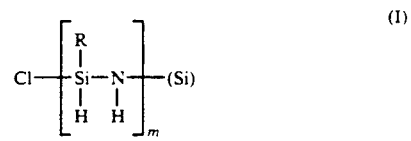

In this formula, m has a value between 1 and 12, and —(Si) is, depending on the chlorosilane employed:

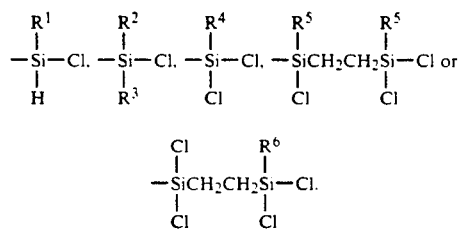

Accordingly, the invention furthermore relates to α,ω-chlorosilazanes of the formula (I)

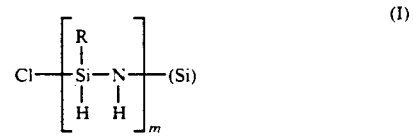

where —(Si) may be the above radicals

In this formula, R is C$_1$-C$_6$-alkyl or C$_2$-C$_6$-alkenyl and, independently of one another, R$^1$-R$^6$ are H, C$_1$-C$_6$-alkyl or C$_2$-C$_6$-alkenyl. The values for m are between 1 and 12.

The α,ω-chlorosilazanes of the formula (I) according to the invention may be converted into silicon-nitride containing ceramic material as follows:

They are heated without a solvent to temperatures between 100° C. and 300° C., whereupon a rearrangement of the linear α,ω-chlorosilazanes into polymeric hydridochlorosilazanes occurs. Heating is preferably effected to temperatures between 150° C. and 250° C.

These polymeric hydridochlorosilazanes can be converted into silicon nitride-containing ceramic material by further heating to up to 1600° C. in an inert-gas atmosphere or in an ammonia atmosphere (see, for example, German Offenlegungsschrift 3 733 727).

EXPERIMENTAL REPORT

Preparation of oligohydridomethylsilazane [—CH$_3$SiH—NH—]$_n$ 100 ml (0.97 mol) of methyldichlorosilane were dissolved in 800 ml of absolute THF, and ammonia was passed in for 3 hours (inlet rate: 0.5 l/min). The reaction temperature was kept in the range from 10° to 15° C. by cooling using an ice bath. In order to complete the reaction, the mixture was stirred at room temperature for 1 hour, and the ammonium chloride was subsequently separated off under argon. The precipitate was washed twice with 350 ml of THF in each case, and the combined THF solutions were evaporated under reduced pressure, to give a clear, readily mobile oil of [—CH₃SiH—NH—]$_n$ where n=3–12 in a yield of 44.5 g=78% of theory.

EXAMPLE 1

Reaction of [—CH₃SiH—NH—]$_n$ with CH₃SiHCl₂

100 g (1.7 mol, based on n=1) of [—CH₃SiH—NH—]$_n$ (n=3–12) were cooled to −5° C. 48.9 g (0.425 mol) of CH₃SiHCl₂ were then slowly added dropwise with stirring, and the abovementioned temperature was maintained for a further 60 minutes.

200 ml of THF were subsequently added, and dimethylamine was passed in to saturation without the temperature of the reaction mixture exceeding 0° C. The precipitated dimethylamine hydrochloride was filtered off, and the filtrate was freed from solvent and volatile constituents.

The resultant oily product was separated by gas chromatography, and the individual fractions were analyzed by mass spectrometry.

The following molecules, inter alia, were detected:

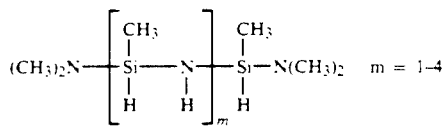

These dimethylamino derivatives arise from the reactive α,ω-dichlorosilazanes:

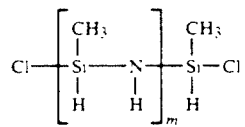

EXAMPLE 2

Reaction of [—CH₃SiH—NH—]$_n$ with CH₃SiHCl₂ and Subsequent Preparation of a Polymeric Hydridochlorosilazane 100 g (1.0 mol, based on n=1) of [—CH₃SiH—NH—]$_n$ (n=3–12) were cooled to −5° C. 48.9 g (0.425 mol) of CH₃SiHCl₂ were then slowly added dropwise with stirring, and the abovementioned temperature was maintained for a further 60 minutes.

The mixture was subsequently heated to an oil-bath temperature of 220° C. over the course of 4 hours. The internal temperature was 190° C. After 2 hours at this temperature, the mixture was allowed to cool.

At 20° C., 110 g of a hard, brittle substance remained, which was dissolved in THF and filtered to remove insoluble constituents. The filtrate was freed from the solvent, leaving a clear material which was glassy-brittle at 20° C. and had a reproducible softening point at about 120° C. (95 g).

Analytical data (in % by weight): Si 44.7%; C 19.2%; N 17.9%; H 6.9%; Cl 11.3%.

Ceramic yield on pyrolysis in N₂ up to 1100° C.: 68.5%. Ceramic yield on pyrolysis in NH₃ up to 1100° C.: 58.9%.

EXAMPLE 3

Reaction of [—CH₃SiH—NH—]$_n$ with Vinylmethyldichlorosilane 100 g (1.7 mol, based on n=1) of [—CH₃SiH—NH—]$_n$ (n=3–12) were cooled to −5° C. 70.5 g (0.5 mol) of vinylmethyldichlorosilane were then slowly added dropwise with stirring, and the abovementioned temperature was maintained for a further 60 minutes.

200 ml of THF was subsequently added, and dimethylamine was passed in to saturation without the temperature of the reaction mixture exceeding 0° C.

The precipitated dimethylamine hydrochloride was filtered off, and the filtrate was freed from the solvent.

The resultant oily product was separated by gas chromatography, and the individual fractions were analyzed by mass spectrometry.

The following molecules, inter alia, were detected:

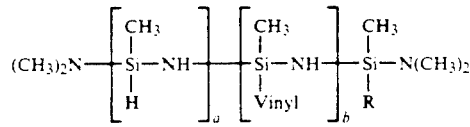

having the following values for the variables:

| | | | |
|---|---|---|---|
| 1. | a = 1 | b = 0 | R = vinyl |
| 2. | a = 2 | b = 0 | R = vinyl |
| 3. | a = 3 | b = 0 | R = vinyl |
| 4. | a = 1 | b = 1 | R = vinyl |
| 5. | a = 2 | b = 1 | R = vinyl |
| 6. | a = 3 | b = 1 | R = H |

These dimethylamino derivatives arise from the corresponding α,ω-dichlorosilazanes.

EXAMPLE 4

Reaction of [—CH₃SiH—NH—]$_n$ with Vinylmethyldichlorosilane and Subsequent Preparation of a Polymeric Hydridochlorosilazane 100 g (1.7 mol, based on n=1) of [—CH₃SiH—NH—]$_n$ (n=3–12) were cooled to −5° C. 70.5 g (0.5 mol) of vinylmethyldichlorosilane were then slowly added dropwise with stirring, and the abovementioned temperature was maintained for a further 60 minutes.

The mixture was subsequently heated to an oil-bath temperature of 220° C. over the course of 4 hours. The internal temperature was 205° C. After 2 hours, the mixture was allowed to cool.

At 20° C., 114 g of a mixture of a very viscous oil and solid constituents remained. THF was added, and the mixture was filtered. The clear filtrate was freed from the solvent, leaving a clear, slightly yellowish, very viscous oil which had a viscosity of about 5 Poise.

Analytical data (in % by weight): Si 38.2%; C31.1%; N 16.2%; H 7.2%; Cl 7.3% .

Ceramic yield on pyrolysis of N₂ up to 1100° C.: 54.2%.

Ceramic yield on pyrolysis of NH₂ up to 1100° C.: 42.1%.

We claim:

1. A process for the preparation of an α,ω-chlorosilazane, which comprises reacting an oligohydridoorganylsilazane of the formula [—RSiH—NH—]$_n$ in which n is from about 3 to about 12 with at least one of the chlorosilanes $R^1HSiCl_2$, $R^2R^3SiCl_2$, $R^4SiCl_3$, $Cl_2R^5SiCH_2CH_2SiR^5Cl_2$ or $Cl_3SiCH_2CH_2SiR^6Cl_2$ where R is $C_1$-$C_6$-alkyl or $C_2$-$C_6$-alkenyl and, independently of one another, $R^1$-$R^6$ are H, $C_1$-$C_6$-alkyl or $C_2$-$C_6$-alkenyl, at from $-20°$ C. to $+50°$ C.

2. The process as claimed in claim 1, wherein R is $CH_3$ and, independently of one another, $R^1$-$R^6$ are H, $C_1$-$C_3$-alkyl or $C_2$-$C_3$-alkenyl.

3. The process as claimed in claim 1, wherein R is $CH_3$ and, independently of one another, $R^1$-$R^6$ are H, $CH_3$ or vinyl.

4. An α,ω-chlorosilazane obtained by the process as claimed in claim 1.

5. An α,ω-chlorosilazane of the formula I

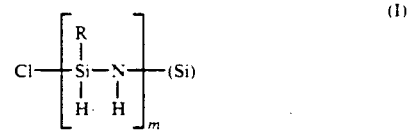

in which m denotes a value between 1 and 12, and —(Si) is a silyl radical of the formula —$SiHR^1Cl$, —$SiR^2R^3Cl$, —$SiR^4Cl_2$, —$SiR^5Cl$—$CH_2CH_2$—$SiR^5Cl_2$ or —$SiCl_2$—$CH_2CH_2$—$SiR^6Cl_2$, where
R is $C_1$-$C_6$-alkyl or $C_2$-$C_6$-alkenyl and, independently of one another, $R^1$-$R^6$ are H, $C_1$-$C_6$-alkyl or $C_2$-$C_6$-alkenyl.

6. An α,ω-chlorosilazane as claimed in claim 5, wherein R is $CH_3$ and, independently of one another, $R^1$-$R^6$ are H, $C_1$-$C_3$-alkyl or $C_2$-$C_3$-alkenyl.

7. An α,ω-chlorosilazane as claimed in claim 5, wherein R is $CH_3$ and, independently of one another, $R^1$-$R^6$ are H, $CH_3$ or vinyl.

* * * * *